United States Patent
Xu et al.

(10) Patent No.: US 11,463,945 B1
(45) Date of Patent: Oct. 4, 2022

(54) METHOD OF STEERING A MOBILE DEVICE FROM A PUBLIC MOBILE NETWORK TO A PRIVATE MOBILE NETWORK

(71) Applicant: Syniverse Technologies, LLC, Tampa, FL (US)

(72) Inventors: Huiyue Xu, Tampa, FL (US); Edward Yau, Tseung Kwan O (HK); Deliang Qian, Tampa, FL (US); Sreenivasa Ganji, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/691,631

(22) Filed: Mar. 10, 2022

Related U.S. Application Data

(60) Provisional application No. 63/160,383, filed on Mar. 12, 2021.

(51) Int. Cl.
*H04W 48/16* (2009.01)
*H04W 48/18* (2009.01)
(Continued)

(52) U.S. Cl.
CPC ............. *H04W 48/16* (2013.01); *H04W 4/14* (2013.01); *H04W 48/18* (2013.01); *H04W 60/04* (2013.01); *H04W 60/06* (2013.01); *H04W 84/042* (2013.01)

(58) Field of Classification Search
CPC .................. H04B 1/0475; H04B 17/14; H04B 2001/0425; H04B 17/104; H04L 25/49;
(Continued)

(56) References Cited

U.S. PATENT DOCUMENTS 10,827,422 B1 * 11/2020 Xu .................. H04W 48/16
2004/0259546 A1 12/2004 Balachandran et al.
(Continued)

FOREIGN PATENT DOCUMENTS

EP 2863670 A1 4/2015
EP 2200376 A1 5/2022
(Continued)

OTHER PUBLICATIONS

Extended European Search Report dated Aug. 8, 2022 for corresponding European Patent Application No. 22161616.2.
(Continued)

*Primary Examiner* — Diane D Mizrahi
(74) *Attorney, Agent, or Firm* — Andriy Lytvyn; Smith & Hopen, P.A.

(57) ABSTRACT

A method and system for steering a mobile device to a preferred network, such as a Private LTE network or a 5G network, in a scenario in which the coverage area of the preferred network overlaps the coverage area of a non-preferred network. If a network function detects that the mobile device is located within the coverage area of the preferred network, the network steering procedure will be triggered. The mobile device will detach from its current network, place that network on a temporary forbidden list, and perform an automatic network selection. If mobile device selects another non-preferred network, the attachment request will be denied, and the mobile device will add that non-preferred network to the temporary forbidden list. This procedure is repeated until the mobile device attaches to the preferred network or a predefined duration expires.

21 Claims, 14 Drawing Sheets

(51) Int. Cl.
*H04W 60/06* (2009.01)
*H04W 4/14* (2009.01)
*H04W 60/04* (2009.01)
*H04W 84/04* (2009.01)

(58) Field of Classification Search
CPC ........ H04L 25/40; H04W 48/16; H04W 4/14; H04W 48/18; H04W 60/04; H04W 60/06; H04W 84/042
See application file for complete search history.

(56) References Cited

U.S. PATENT DOCUMENTS

| | | |
|---|---|---|
| 2006/0035636 A1 | 2/2006 | Pirila |
| 2006/0293066 A1 | 12/2006 | Edge et al. |
| 2007/0297364 A1 | 12/2007 | Fagridas |
| 2008/0020756 A1 | 1/2008 | Jiang |
| 2008/0037481 A1 | 2/2008 | Chiang et al. |
| 2008/0064393 A1 | 3/2008 | Oommen et al. |
| 2010/0173628 A1 | 7/2010 | Hosain et al. |
| 2010/0197320 A1 | 8/2010 | Ulrich et al. |
| 2010/0234021 A1 | 9/2010 | Ngai et al. |
| 2014/0073366 A1 | 3/2014 | Xing et al. |
| 2018/0242110 A1 | 8/2018 | Suzuki et al. |
| 2020/0045599 A1 | 2/2020 | Bhardwaj et al. |

FOREIGN PATENT DOCUMENTS

| | | |
|---|---|---|
| GB | 2395867 A | 6/2004 |
| WO | 2012066337 A1 | 5/2012 |

OTHER PUBLICATIONS

"3rd Generation Partnership Project; Technical Specification Group Core Network and Terminals; Non-Access-Stratum (NAS) functions related to Mobile Station (MS) in idle mode (Release 16)", 3GPP Standard; Technical Specification; 3GPP TS 23.122, 3rd Generation Partnership Project (3GPP), vol. CT WGI, No. V16.8.0 Dec. 18, 2020 (Dec. 18, 2020), pp. 1-83, XP051975152, Retrieved from the Internet: URL:https://ftp.3gpp.org/Specs/archive/23_series/23.122/23122-g80.zip 23122-g80.doc [retrieved on Dec. 18, 2020].

* cited by examiner

METHOD OF STEERING A MOBILE DEVICE FROM A PUBLIC MOBILE NETWORK TO A PRIVATE MOBILE NETWORK

PRIORITY CLAIM

This non-provisional application claims priority to U.S. Provisional Application No. 63/160,383 filed Mar. 12, 2021, which is incorporated herein by reference in its entirety.

BACKGROUND OF THE INVENTION

1. Field of the Invention

This invention relates generally to the field of telecommunication networks. More specifically, the invention pertains to a method for improving mobile network steering and traffic routing efficiency, such that a mobile device is steered to a preferred network in scenarios in which coverage area of a preferred network (for example, Private LTE or 5G network) overlaps coverage area of one or more non-preferred Public Land Mobile Networks (PLMN) (for example, public 3G, 4G, and 5G networks).

2. Brief Description of the Related Art

U.S. Pat. No. 10,827,422 ('422 Patent), filed by Syniverse Technologies, LLC, describes a method and a system for steering a User Equipment (UE) to Private Long Term Evolution (LTE) and 5G networks, when the UE enters a geographic location in which a Private LTE or a 5G network has coverage. In some embodiments disclosed in the '422 Patent, the intelligent steering method/system may involve the following: 1) a Subscriber Identity Module (SIM) Tool Kit Applet to report device location and radio strength to a centralized Network Selection Engine, 2) a Network Selection Engine to determine whether the UE is within the Private LTE/5G network coverage, 3) sending an Over-The-Air (OTA) Short Message Service (SMS) message to the UE to trigger network scanning and automatic selection to the preferred Private LTE/5G network, 4) subsequent to receiving the OTA SMS message, the UE will attach to a preferred Private LTE/5G network and will report the attachment status to the Network Selection Engine.

After the SIM/UE receives an OTA message to re-select network, the SIM will request the UE to execute the automatic network selection procedure, as described in 3GPP TS 23.122. This network selection procedure selects an available mobile network according to the following sequence: 1) Home Public Land Mobile Network (HPLMN) or Equivalent Home Public Land Mobile Network (EHPLMN) list, 2) User-Controlled PLMN list with Access Technology, 3) Operator-Controlled PLMN list with Access Technology, 4) other PLMN with high quality signal, 5) other PLMN of decreasing signal quality. In some situations, the UE may not select the Private LTE or 5G network due to the presence of another, higher priority network according to the above network-selection sequence. For example, when the HPLMN is available, the UE will always select the HPLMN as the highest priority network, even if the preferred network in that geographical area is the Private LTE network.

Accordingly, what is needed is a method of forcing a mobile device to attach to the preferred Private LTE or 5G network during an automatic network selection procedure.

SUMMARY OF THE INVENTION

Embodiments of the present invention pertains to a novel and non-obvious method of directing a mobile device to attach to a preferred network during an automatic network selection procedure. Non-limiting examples of preferred networks include Private LTE and Private 5G mobile networks. In an embodiment, the invention pertains to a scenario in which a mobile device is initially attached to a non-preferred network and, subsequently, moves into a geographic area where both the non-preferred network and a preferred network have overlapping coverage.

After determining that the current location of the mobile device is within the coverage area of the preferred mobile network, a steering command is sent to the mobile device. The steering command may be sent to the mobile device as an Over-The-Air (OTA) Short Message Service (SMS) message. The steering command may be a 'Reset-Refresh' message.

In an embodiment, the steering command is triggered by a network function hosted at home network of the mobile device, for example a Home Subscriber Server (HSS) or Unified Data Management (UDM) node. The steering command directs the mobile device to detach from the non-preferred mobile network to which it is currently attached, add that network to a list of Forbidden Public Land Mobile Networks (FPLMN), and to initiate a network selection procedure to attach to another available network that is not included on the list of FPLMN. The list of FPLMN may be stored on a Subscriber Identity Module (SIM).

If the mobile device attempts to attach to another non-preferred network, the attachment request will be rejected, for example with a 'RoamingNotAllowed' message. In response to the attachment rejection, the mobile device is configured to add the rejected non-preferred network to the list of FPLMN and to re-initiate the network selection procedure to attach to another available network not included on the list of FPLMN. When the mobile device requests to attach to the preferred network, the attachment request is accepted, thereby enabling the mobile device to attach to the preferred mobile network. In this manner, the mobile device is steered from a non-preferred network to a preferred network.

In an embodiment, the list of FPLMN is cleared upon expiration of a first predetermined duration after the mobile device receives the steering command. The timer for the first predetermined duration may be set in the SIM responsive to receiving the steering command. After the FPLMN list has been cleared, the mobile device will be able to attach to a non-preferred network upon moving to a new location outside of the coverage area of the preferred network.

In an embodiment, upon expiration of a second predetermined duration after the mobile device attaches to the non-preferred network, a network application is configured to query the non-preferred network for the updated location of the mobile device to determine whether the new location of the mobile device is within the coverage area of the preferred mobile network. If it is determined that the mobile device is located within the coverage area of the preferred network, a steering command will be sent to the mobile device. The step of determining whether the current location of the mobile device is within the coverage area of the preferred mobile network and the step of triggering a steering command to the mobile device may be executed by a network application, which may be hosted at the home network to which the mobile device is subscribed.

In an embodiment, after sending the steering command, a timer may be set for a predetermined duration during which all attachment request from non-preferred networks will be rejected.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and changes may be made without departing from the scope of the invention.

Embodiments of the present invention pertain to a method and a system for improving mobile network steering and traffic routing efficiency in geographic locations in which the coverage area of a Private LTE network/5G network overlaps the coverage area of a Public Land Mobile Network (PLMN), such a public 3G, 4G (LTE), or 5G network.

Figure 1A:
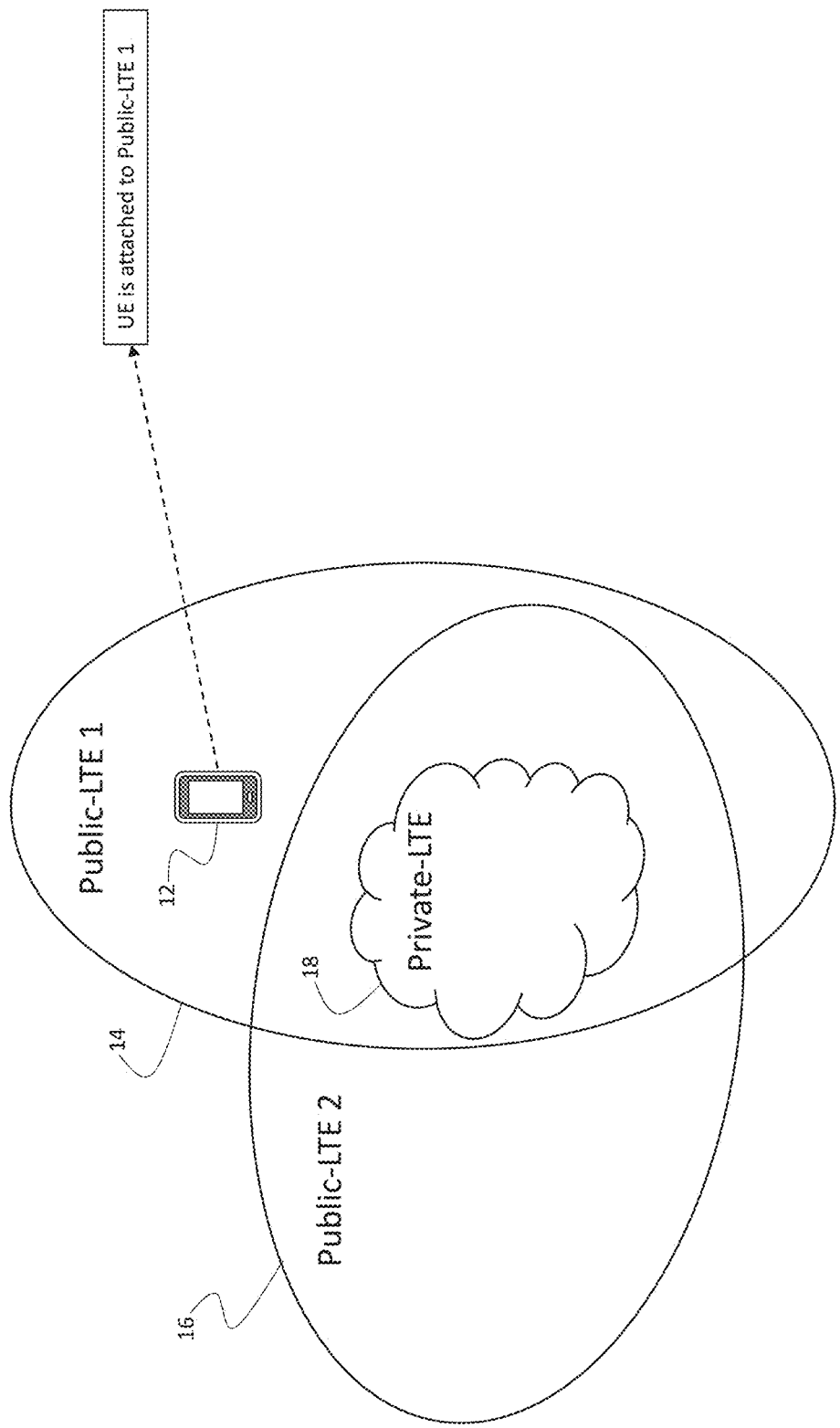
FIG. 1A is a diagram schematically depicting an embodiment of the invention in which two non-preferred Public LTE networks and a preferred Private LTE network have overlapping coverage and the mobile device is positioned in a location where only a non-preferred Public LTE network has coverage.

FIG. 1A depicts an exemplary embodiment, in which a mobile device (also referred to as User Equipment (UE)) 12 is initially positioned within a geographic location in which a first Public LTE network 14 has coverage. As used herein, the terms "mobile device" and "User Equipment" refer to any electronic device equipped with hardware, software, and/or firmware components enabling the electronic device to connect to a mobile network. Because in the scenario depicted in FIG. 1A, UE 12 is located in a geographic location in which only first Public LTE network 14 has coverage, UE 12 is initially attached to first Public LTE network 14.

Figure 1B:
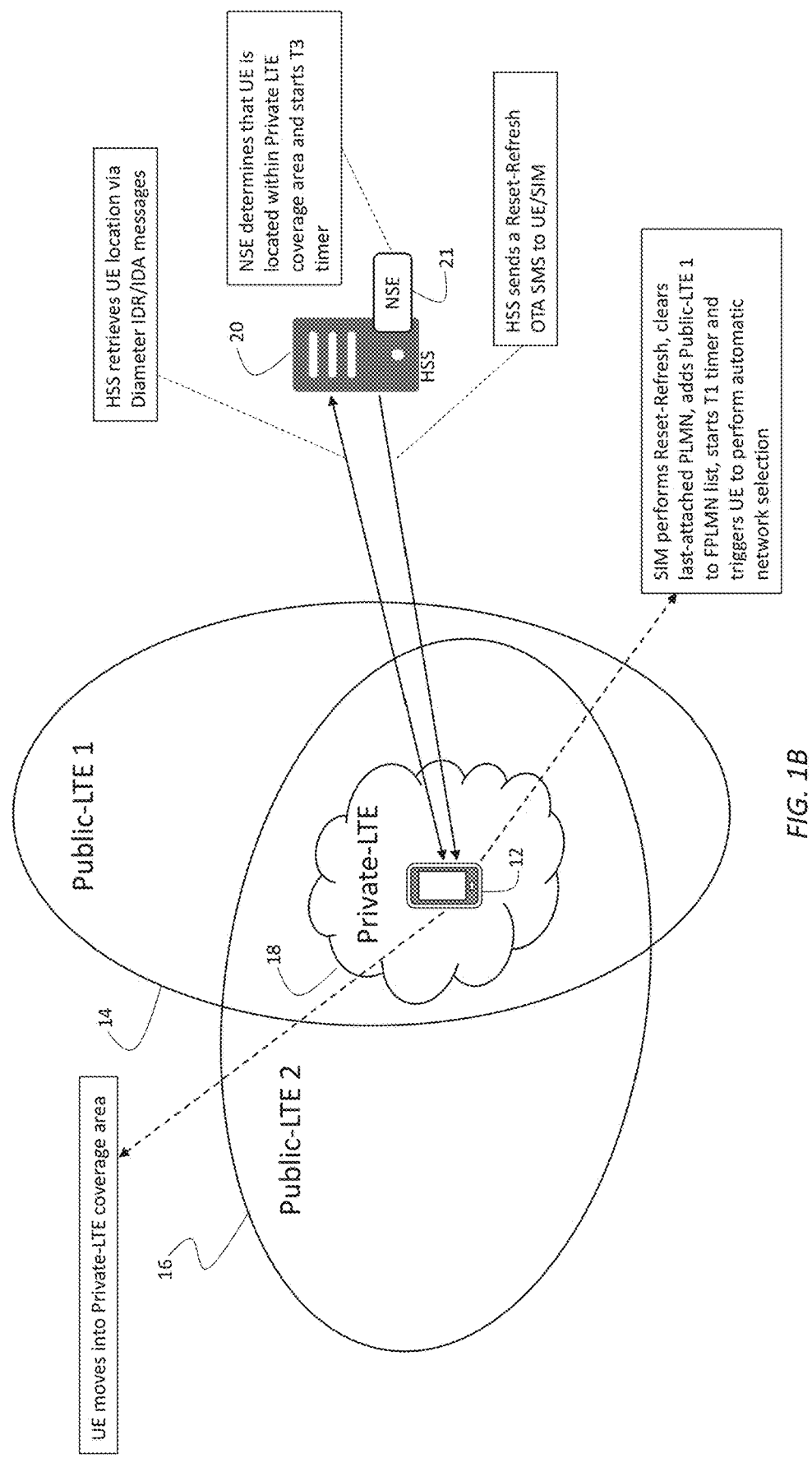
FIG. 1B is a diagram depicting the mobile device moving into a geographic location with overlapping coverage of two Public LTE networks and a private LTE network. The mobile device receives a steering command directing the mobile device to detach from the Public LTE network and to initiate a network selection procedure.

FIG. 1B depicts that UE 12 has moved to a new geographic location. In this location, first Public LTE network 14, a second Public LTE network 16, and a Private LTE network 18 have overlapping coverage. FIG. 1B depicts that Home Subscriber Server (HSS) 20 of Home Public Land Mobile Network (HPLMN) to which UE 12 is subscribed is configured to obtain information pertaining to current location of UE 12. In an embodiment, this action may be triggered by a Network Steering Engine (NSE) 21 hosted at HSS 20. As used herein, the term "Network Steering Engine" refers to a network function which may be in a form of (1) software application configured to be executed by a computer processor, (2) a special-purpose hardware programmed with software and/or firmware, or (3) a combination of special-purpose and programmable circuitry. Hence, embodiments may include a machine-readable medium having stored thereon instructions which may be used to program a computer (or other electronic devices) to perform a process.

Figure 2:
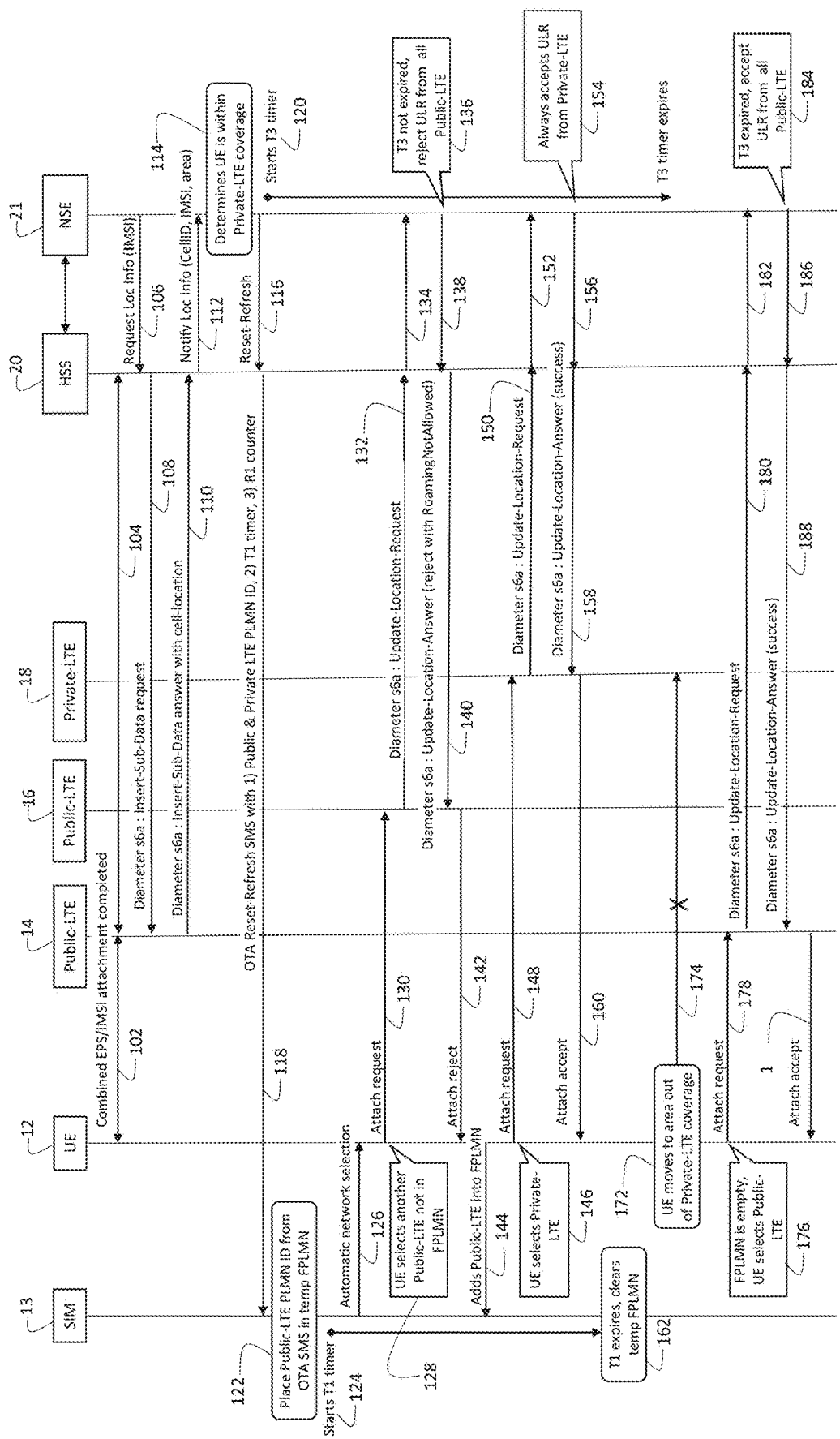
FIG. 2 is a signaling diagram depicting an exemplary signaling flow for the scenario depicted in FIGS. 1A-E.

As depicted in FIGS. 1B and 2, NSE 21 may be configured to trigger HSS 20 to retrieve location of UE 12 via Diameter Insert-Subscription-Data-Request (IDR) and Insert-Subscription-Data-Answer (IDA) messages. The information obtained by HSS 20 pertaining to the current location of UE 12 can be used by NSE 21 to determine whether UE 12 is within coverage area of Private LTE network 18. (U.S. Pat. No. 10,827,422, which is incorporated herein by reference, discloses exemplary methods according to which such determination can be made.)

Next, upon determining that UE 12 is positioned within a geographic location in which Private LTE network 18 has coverage, NSE 21 triggers HSS 20 to send a 'Reset-Refresh' Over-the-Air (OTA) Short Message Service (SMS) to UE 12, which UE 12 passes to its Subscriber Identity Module (SIM) 13. Upon sending the OTA SMS to UE 12, NSE 21 is configured to start another timer, referred to herein as a T3 timer. The T3 timer is set to a predetermined duration during which NSE 21 is configured to trigger HSS 20 to reject all attachment requests from any network that is not the preferred Private LTE network 18.

The 'Reset-Refresh' message (also referred to as a "steering command") directs UE 12/SIM 13 to execute the following steps: (1) disconnect from the current mobile network (first Public LTE network 14); (2) place that mobile network on a list of temporary Forbidden Public Land Mobile Networks (FPLMN); and (3) trigger UE 12 to perform an automatic network selection procedure. In addition, the OTA SMS command may contain the following: (1) the Private-LTE PLMN ID, (2) list of Public-LTE PLMN ID (which SIM will enter as Forbidden PLMN), and (3) the T1 timer value and the R1 counter value. T1 timer value is a predetermined duration upon expiration of which SIM 13 will clear the temporary FPLMN list. R1 is a counter for a maximum number of cycles of automatic network selection and attachment attempts.

Figure 1C:
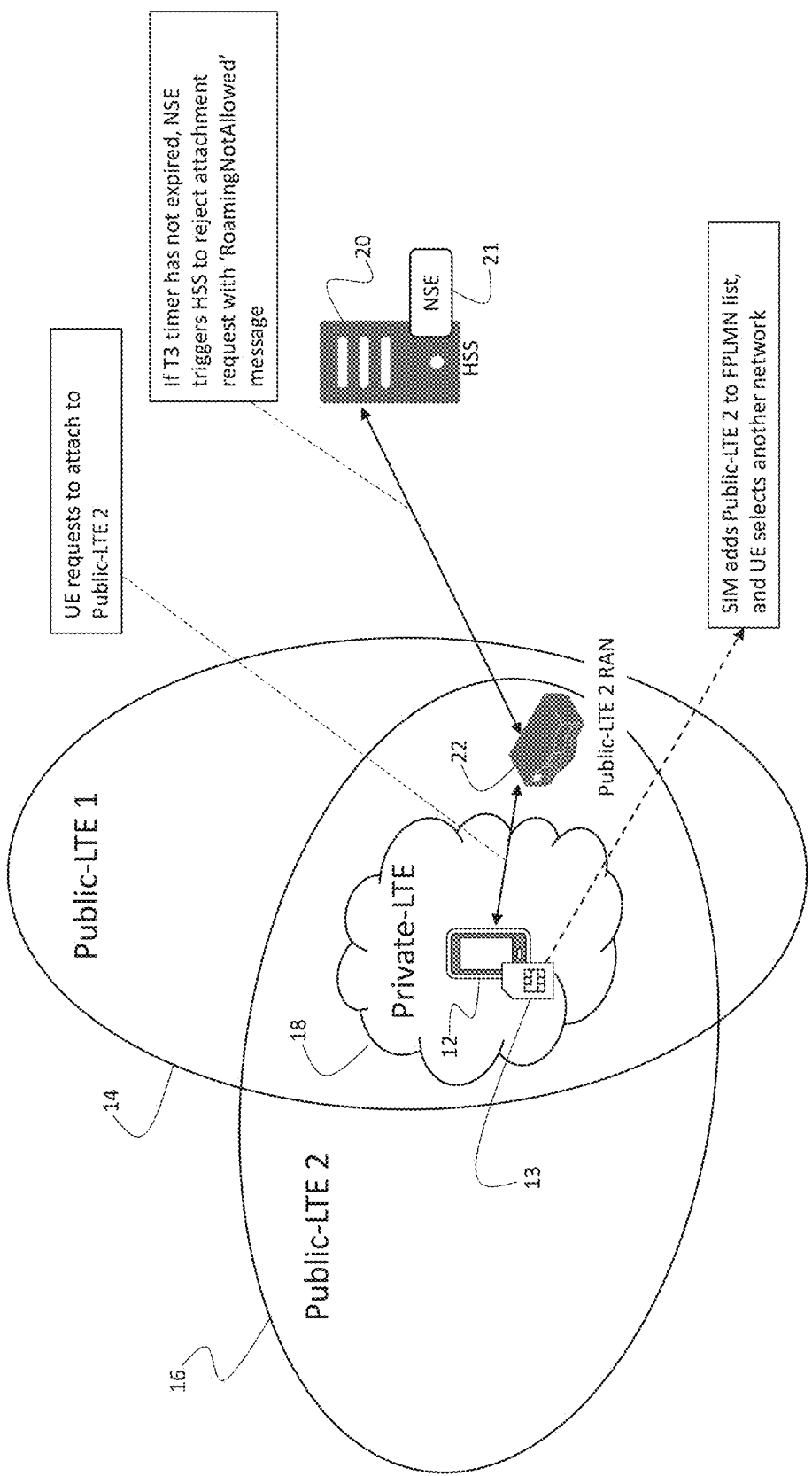
FIG. 1C is a diagram depicting the mobile device attempting to attach to a second Public LTE network and that attempt being rejected.

Next, FIG. 1C depicts a scenario in which, upon detaching from first Public LTE network 14 and placing this network onto the temporary FPLMN list, UE 12 attempts to attach to a second Public LTE network 16. During the predetermined duration set on the T3 timer, upon receiving attachment request from a Radio Access Network (RAN) 22 of second Public LTE network 16, NSE 21 directs HSS 20 to reject this attachment request with a 'RoamingNotAllowed' message. Upon receipt of this rejection, SIM 13 of UE 12 is configured to add second Public LTE network 16 to the temporary FPLMN list. (If other non-preferred networks have coverage area in the location of UE 12, and UE 12 were to attempt to attach to these non-preferred networks, HSS 20 would continue to reject such requests until T3 timer expires. SIM 13 adds each rejected non-preferred network to the temporary FPLMN list. When performing subsequent automatic network selection, UE 12 is configured to skip the networks on the temporary FPLMN list.)

Figure 1D:
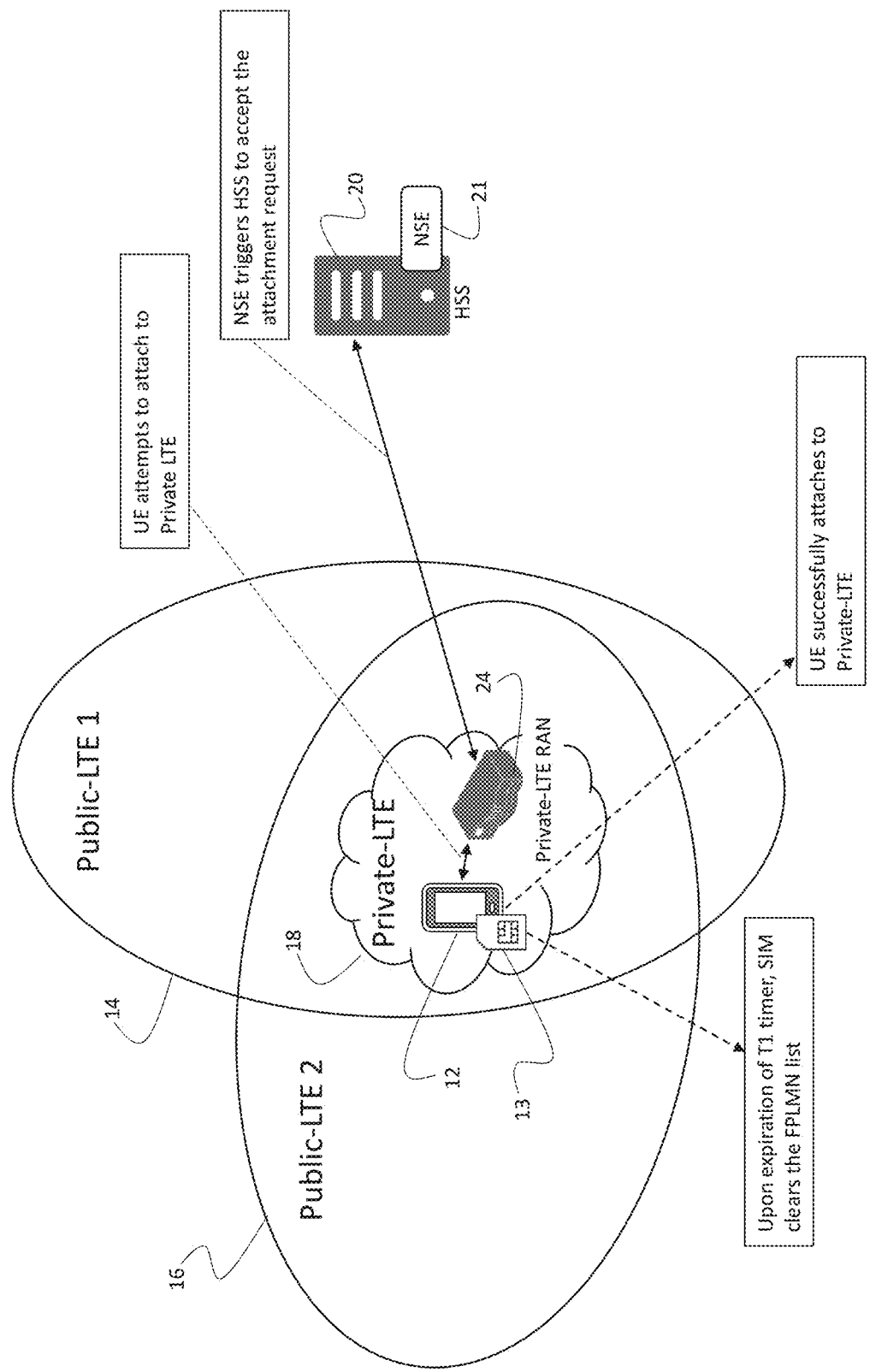
FIG. 1D is a diagram depicting the mobile device attaching to the Private LTE network.

FIG. 1D depicts that, after both first Public LTE 14 and second Public LTE 16 have been placed onto the temporary FPLMN list, UE 12 will request to attach to the only remaining network with available coverage, which is Private LTE 18 (the preferred network). Upon receipt of attachment request from Private-LTE RAN 24, NSE 21 directs HSS 20 to accept this attachment request. In this manner, UE 12 is successfully steered to Private LTE 18, which is the preferred network.

Upon expiration of T1 timer, SIM 13 is configured to clear the temporary FPLMN list, enabling UE 12 to subsequently connect to first Public LTE network 12 or second Public LTE network 14 (assuming that T3 timer has also expired because, as explained above, HSS 20/NSE 21 is configured to reject all attachment request from non-preferred networks while T3 timer is active).

Figure 1E:
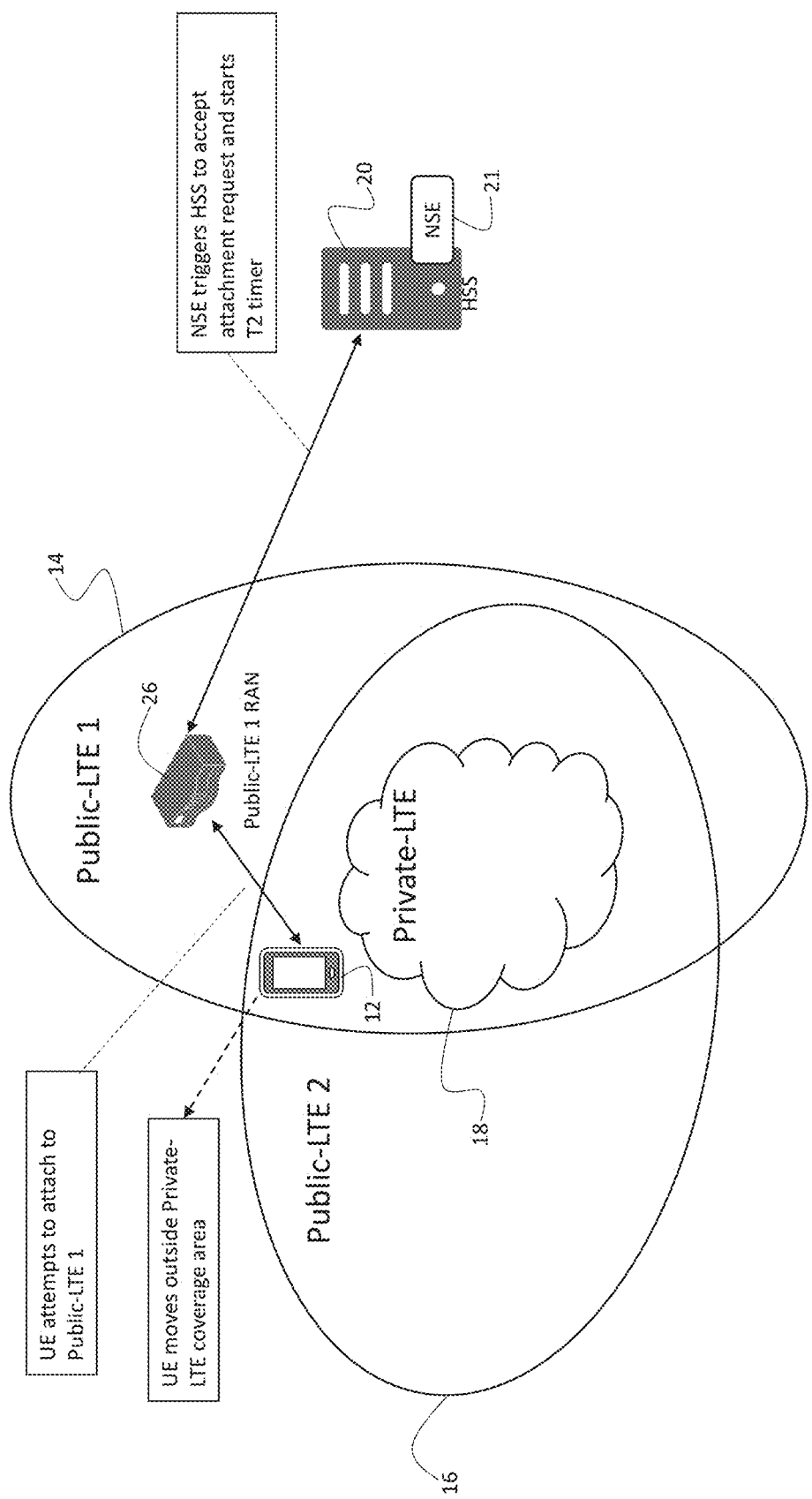
FIG. 1E is a diagram depicting the mobile device moving outside coverage area of the Private LTE network and attaching to a Public LTE network.

FIG. 1E depicts that UE 12 has moved to a new location outside of the coverage area of Private LTE network 18. In this scenario, it is assumed that T1 timer has expired (which means that SIM 13 has cleared the temporary FPLMN list) and T3 timer has also expired (which means that HSS 20/NSE 21 is no longer configured to reject attachment requests from non-preferred networks). Thus, when UE 12 loses connection to Private LTE network 18 and attempts to connect to first Public LTE network 14, HSS 20 will accept attachment request from RAN 28 of Public LTE network 14. In this manner, UE 12 can receive mobile network services from a non-preferred network when UE 12 moves outside coverage area of the preferred network.

Figure 1F:
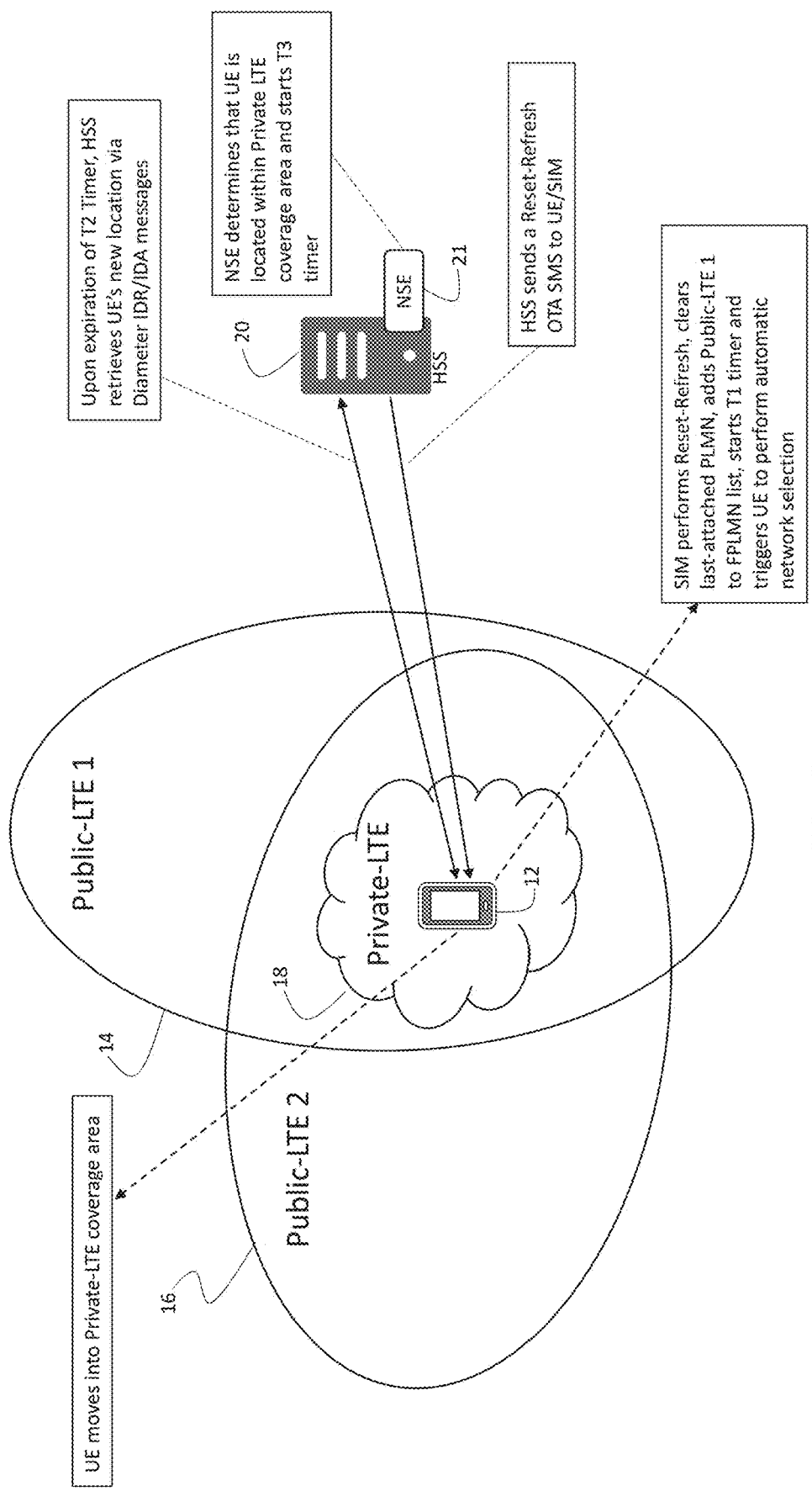
FIG. 1F is a diagram depicting the mobile device returning to a location within the coverage area of the Private LTE network, and the steering procedure being initiated to steer the mobile device to attach to the Private LTE network.

When HSS 20 accepts the attachment request from first Public LTE network 14, which is a non-preferred network, NSE 21 is configured to start a T2 timer set to a predetermined duration, upon expiration of which NSE 21 triggers HSS 20 to query first Public LTE network 14 for the updated location of UE 12. FIG. 1F depicts that, if NSE 21 determines that UE 12 is located within the coverage area of Private LTE network 18, NSE 21 will trigger HSS 20 to send the 'Reset-Refresh' OTA SMS message to UE 12 to initiate the steering process described above. In this manner, NSE 21 is configured to steer UE 12 to the preferred network when its coverage is available, while enabling UE 12 to connect to another, non-preferred network when UE 12 is outside the coverage area of the preferred network.

In an embodiment, NSE 21 may be configured to calculate a distance from the current location of UE 12 to the nearest location in which preferred network 34 has coverage and will dynamically set a timer for time T2 based on the expected arrival of UE 12 into a location in which the preferred network has coverage. Upon expiration of the timer T2, NSE 21 triggers a location update for the new location of UE 12.

FIG. 2 depicts an exemplary signalling diagram for the embodiment of the invention depicted in FIGS. 1A-E. In steps 102 and 104, UE 12 attaches to the first Public LTE network 14. In step 106, NSE 21 triggers HSS 20 of HPLMN to retrieve the location of UE 12 using a Diameter Insert Subscriber-Data Request (IDR), which HSS 20 sends to first Public LTE network 14 in step 108. In step 110, in response to the IDR, the Mobility Management Entity (MME) of first Public LTE network 14 returns information pertaining to location of UE 12 in an Insert Subscriber-Data Answer (IDA) message. In step 112, HSS 20 communicates the location information of UE 12 to NSE 21.

In step 114, NSE 21 detects that UE 12 is located within a geographic area in which the Private-LTE network 18 has coverage. In steps 116 and 118, NSE 21 triggers HSS 20 to send a 'Reset-Refresh' OTA command via SMS to UE 12 (which UE 12 passes on to SIM card 13). The OTA SMS command contains the following: (1) PLMN ID of the Private-LTE network 18, (2) list of Public-LTE PLMN ID (which SIM will put it as Forbidden PLMN), and (3) the T1 timer value and the R1 counter value. At this point, in step 120, NSE 21 starts the T3 timer for a predetermined duration, during which NSE 21 will trigger rejections of all attachment requests from non-preferred networks.

In step 122, upon receiving the OTA SMS, SIM card 13 requests UE 12 to execute a 'REFRESH' command and procedure, per 3GPP TS 31.111. UE 12/SIM 13 clears the 'last-attached PLMN' stored in its memory, sets the public-LTE FPLMN ID in a temporary Forbidden (FPLMN) list, and starts the T1 timer in step 124. In steps 126 and 128, UE 12 automatically searches and selects a network to attach. All PLMNs in the Forbidden PLMN list will be skipped.

In this exemplary scenario, in step 130, UE 12 attempts to attach to a second Public LTE network 16, which is not yet listed in FPLMN list. In step 132, second Public LTE network 16 sends a Diameter Update-Location-Request (ULR) to HSS 20. In step 134, NSE 21 receives this attach request. In step 136, T3 timer is still active and, therefore, NSE 21 is configured to reject all attach requests from non-preferred networks. Thus, in steps 138 and 140, NSE 21 triggers HSS 20 to send a 'RoamingNotAllowed' rejection to second Public LTE network 16. In step 142, UE 12 receives the attach rejection message. In step 144, UE 12 adds second Public LTE network 16 to the FPLMN list.

Next, in step 146, UE 12 will perform another automatic network selection procedure, skipping first Public LTE network 14 and second Public LTE network 16 because they both have been placed on the FPLMN list. Thus, UE 12 will select Private LTE network 18. In step 148, UE 12 requests to attach to Private-LTE network 18. In step 150, Private LTE network 18 sends a ULR message to HSS 20. In step 152, HSS 20 communicates this attachment request to NSE 21. In step 154, NSE 21 is configured to accept the attach request from Private LTE network 18 (which is the preferred network). In steps 156 and 158, NSE 21 triggers HSS 20 to send ULA message to Private LTE network 18. In step 160, UE 12 receives the attach accept message and successfully attaches to Private LTE network 18.

In step 162, when the T1 timer expires, regardless of whether the UE is attached to a network, SIM card 13 will execute the following steps: (1) clear its temporary FPLMN list, and (2) reset the T1 timer. (If the UE is not attached to any network, SIM 13 will trigger UE 12 to perform an automatic network attachment. If UE 12 is still not attached to any network, this process will be repeated until the R1 counter is reached.)

In step 172, UE 12 leaves the coverage area of Private LTE network 18 or enters a Private-LTE dead-zone (without coverage). In step 174, UE 12 will detach from Private-LTE network 18. In step 176, (because the FPLMN list has already cleared in step 162) UE 12 selects first Public LTE network 14. In step 178, UE 12 sends an attach request to first Public LTE network 14. In step 180, first Public LTE network 14 sends a ULR to HSS 20. In step 182, HSS 20 communicates this attach request to NSE 21. Because the T3 has expired, NSE 21 is no longer configured to reject attachment requests from non-preferred networks. Therefore, in step 184, NSE 21 accepts the ULR from first Public LTE network 14. In steps 186 and 188, NSE 21 triggers HSS 20 to send ULA to first Public LTE network 14. In step 190, first Public LTE network 14 sends an attach accept message to UE 12. At this point, UE 12 is attached to first Public LTE network 16 and will remain attached thereto while UE 12 is outside the coverage area of Private LTE 18.

As explained above, upon accepting attach request from a non-preferred network, NSE 21 starts a T2 timer. Upon expiration of the T2 timer, NSE 21 will trigger HSS 20 to quarry UE 12 for its updated location. If the updated location of UE 12 is within the coverage area of Private LTE 18, NSE 21 will trigger HSS 20 to send another steering command ('Reset-Refresh') to UE 12 to steer UE 12 to Private LTE network 18.

Figure 3A:
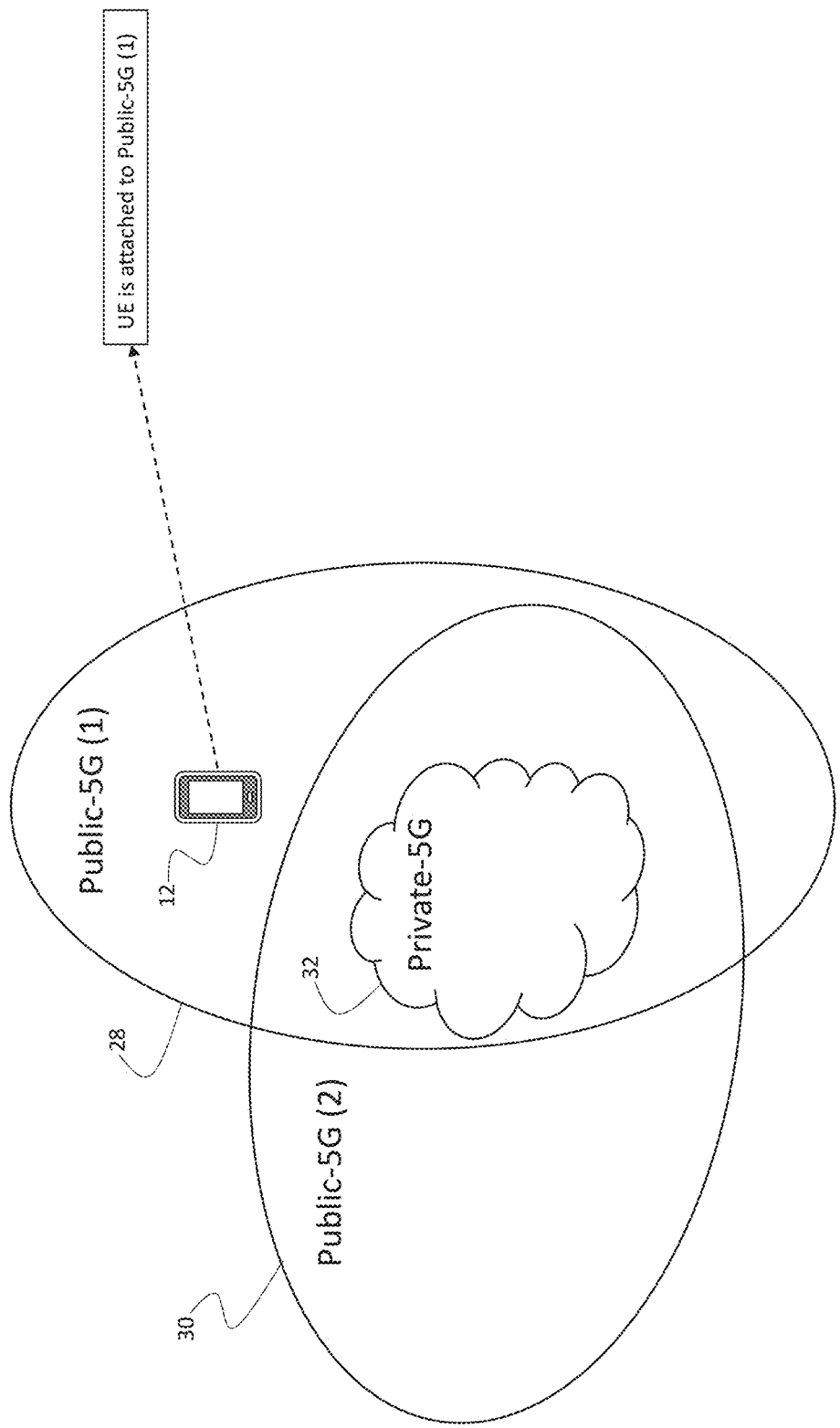
FIG. 3A is a diagram schematically depicting an embodiment of the invention in which two non-preferred Public 5G networks and a preferred Private 5G network have overlapping coverage, and the mobile device is positioned in a location where only a non-preferred Public 5G network has coverage.

FIGS. 3A-F depict another exemplary scenario in which non-preferred networks are first Public 5G network 28 and second Public 5G network 30. These non-preferred networks have coverage areas that overlap with the coverage area of the preferred Private 5G network 32. FIG. 3A depicts that UE 12 is initially positioned in a geographic location where only first Public 5G network 28 has coverage. In this situation, UE 12 is attached to first Public 5G network 28 because Private 5G network 32 does not have coverage in the geographic location where UE 12 is positioned.

Figure 3B:
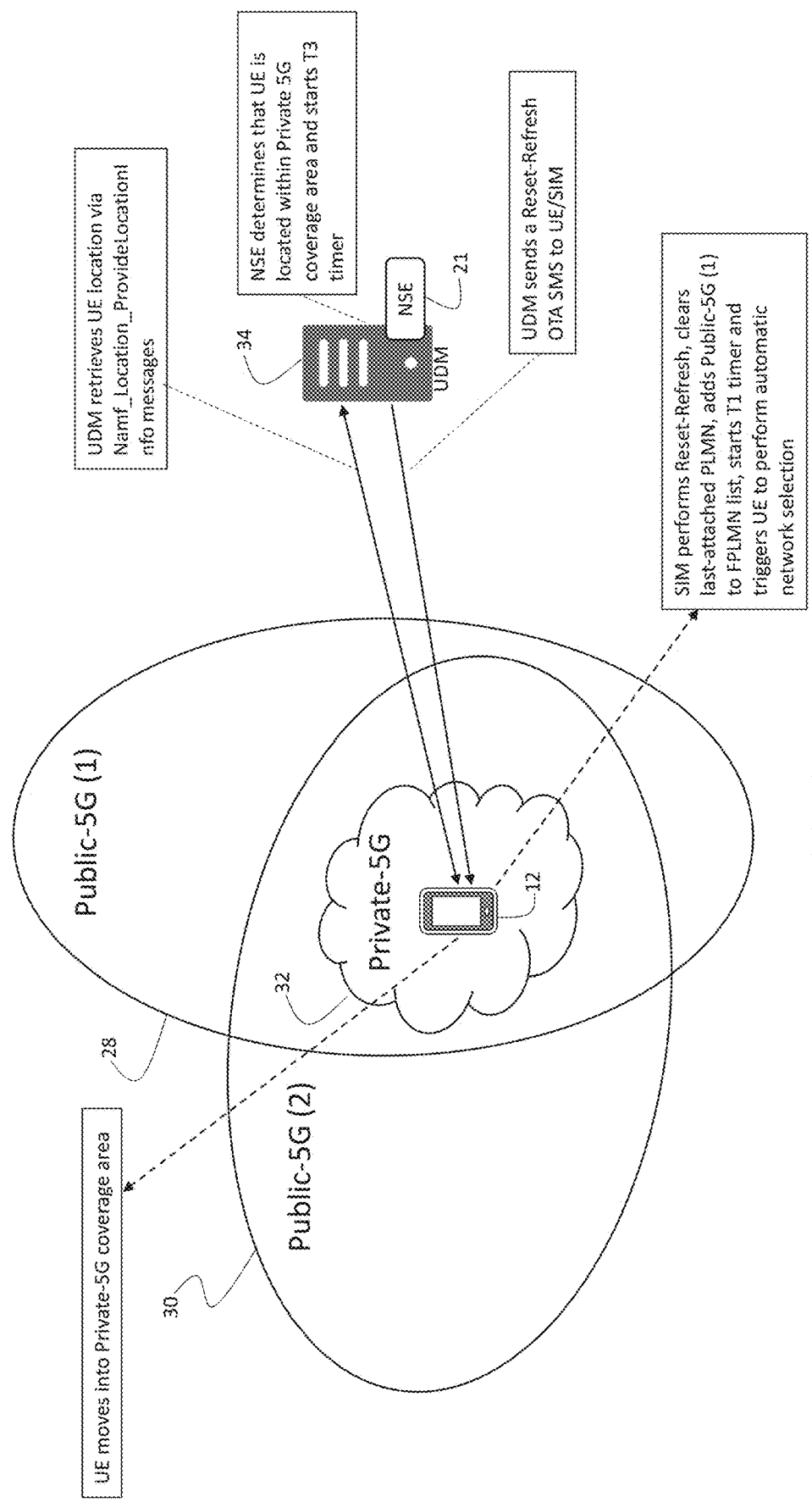
FIG. 3B is a diagram depicting the mobile device moving into a geographic location having overlapping coverage of two Public 5G networks and a private 5G network. The mobile device receives a steering command directing it to detach from the Public 5G network and to initiate the network selection procedure.

FIG. 3B depicts that, upon expiration of a predetermined duration (T2 timer), NSE 21 hosted on Unified Data Management (UDM) 34 of the HPLMN to which UE 12 is subscribed is configured to retrieve the location of UE 12 with Namf_Location_ProvideLocationInfo request, the Public 5G Access and Mobility Management Function (AMF) returns the location of UE 12 in a Namf_Location_ProvideLocationInfo response message. If the current location of UE 12 is within coverage area of Private 5G network 32, NSE 21 will trigger UDM 34 to send 'Reset-Refresh' OTA SMS message to UE 12/SIM 13.

Figure 3C:
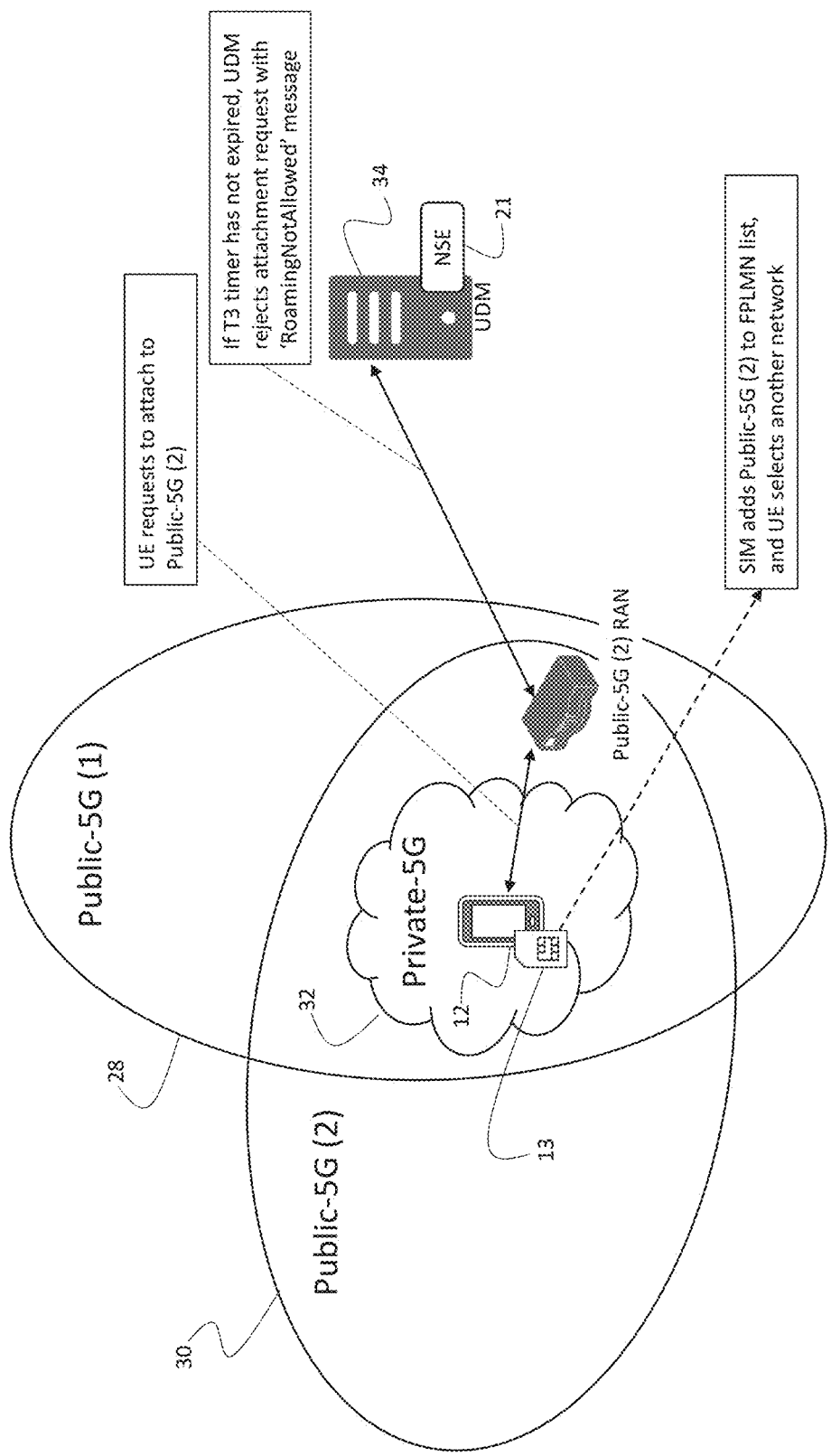
FIG. 3C is a diagram depicting the mobile device attempting to attach to a second Public 5G network and that attempt being rejected.

Upon receiving the OTA SMS, SIM 13 requests UE 12 to execute the 'REFRESH' command and procedure, per 3GPP TS 31.111. The UE clears the last-attached PLMN' stored in its memory, sets the public-5G FPLMN ID in a temporary FPLMN list, and starts T1 timer. UE 12 will search and automatically select a network to attach. All PLMNs in the Forbidden PLMN list will be skipped. FIG. 3C depicts that, if UE 12 attempts to attach to second Public-5G network 30 (which is not listed in the FPLMN list), NSE 21 in UDM 34 will also reject with 'RoamingNotAllowed', and UE 12 will add this second Public 5G network 30 to the FPLMN list.

Figure 3D:
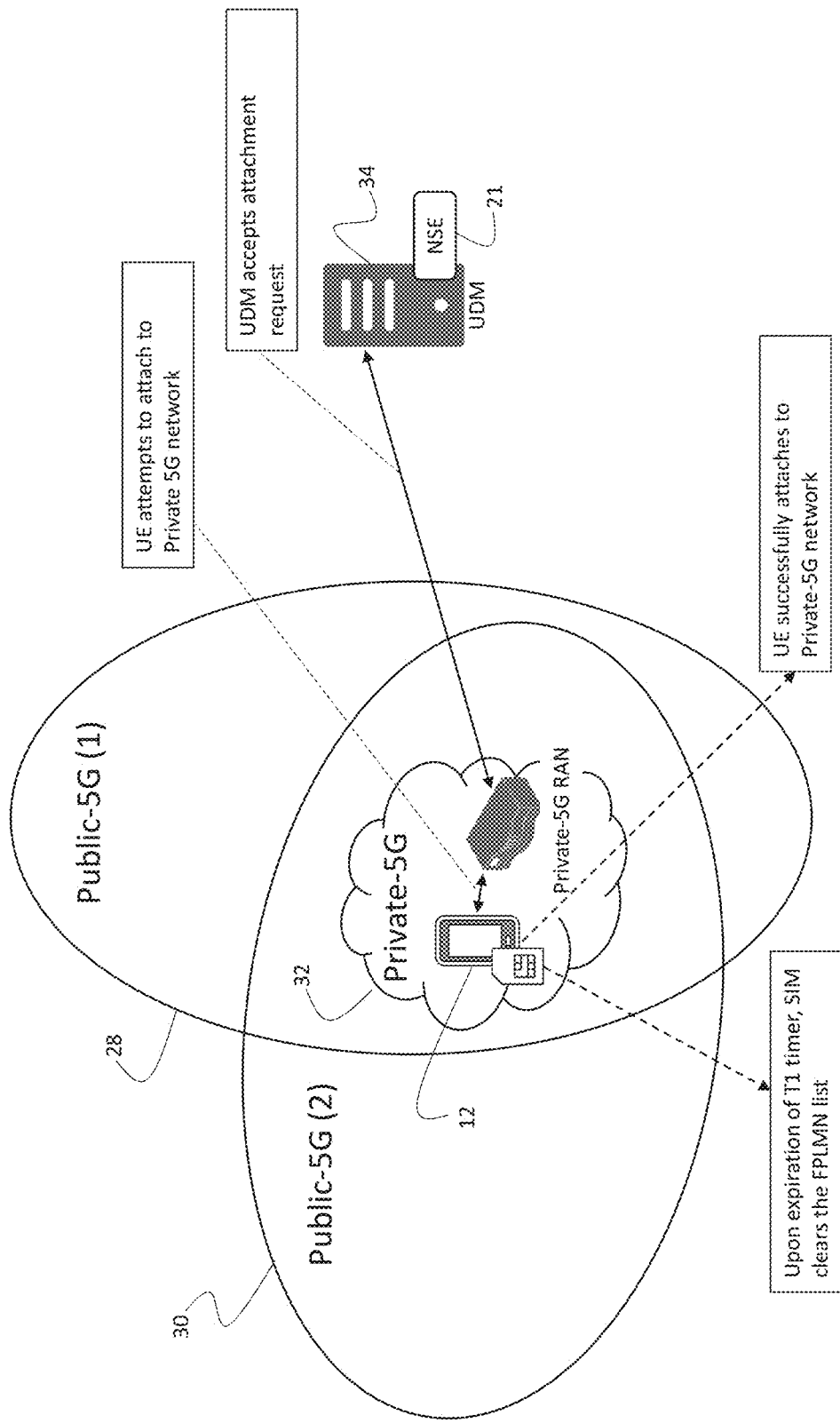
FIG. 3D is a diagram depicting the mobile device attaching to the Private 5G network.

FIG. 3D depicts that after adding available non-preferred networks to the FPLMN list, UE 12 will attach to the Private-5G network.

When the T1 timer expires, regardless of whether the UE is attached to a network, SIM card 13 will execute the following steps: (1) clear its temporary FPLMN list, and (2) reset the T1 timer. If UE 12 is not attached to any network, SIM 13 will trigger UE 12 to perform an automatic network attachment procedure. If UE 12 is still not attached to any network, this process repeats until R1 counter is reached.

Figure 3E:
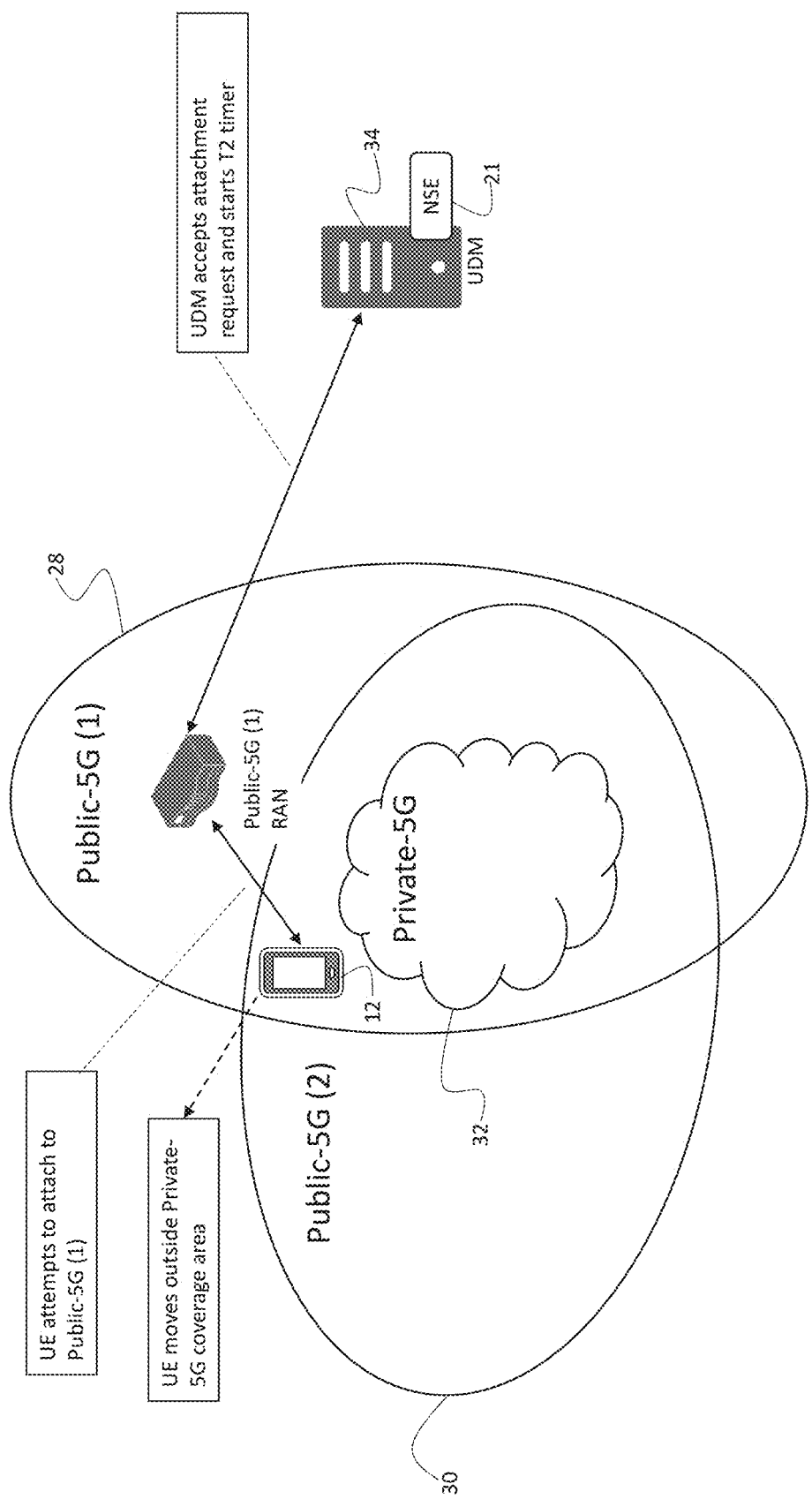
FIG. 3E is a diagram depicting the mobile device moving outside of the coverage area of the Private 5G network and attaching to a Public 5G network.

FIG. 3E depicts that UE 12 leaves coverage area of Private 5G network 30 and, therefore, detaches from Private-5G network 30. Because the FPLMN list has already been cleared, when UE 12 attempts to attach to first Public-5G network 28, NSE 21 will trigger UDM 34 to accept the attachment attempt (assuming T3 timer expired). At this point NSE 21 will start T2 timer, upon expiration of which NSE 21 will trigger UDM 34 to quarry Public 5G network 28 for updated location of UE 12.

Figure 3F:
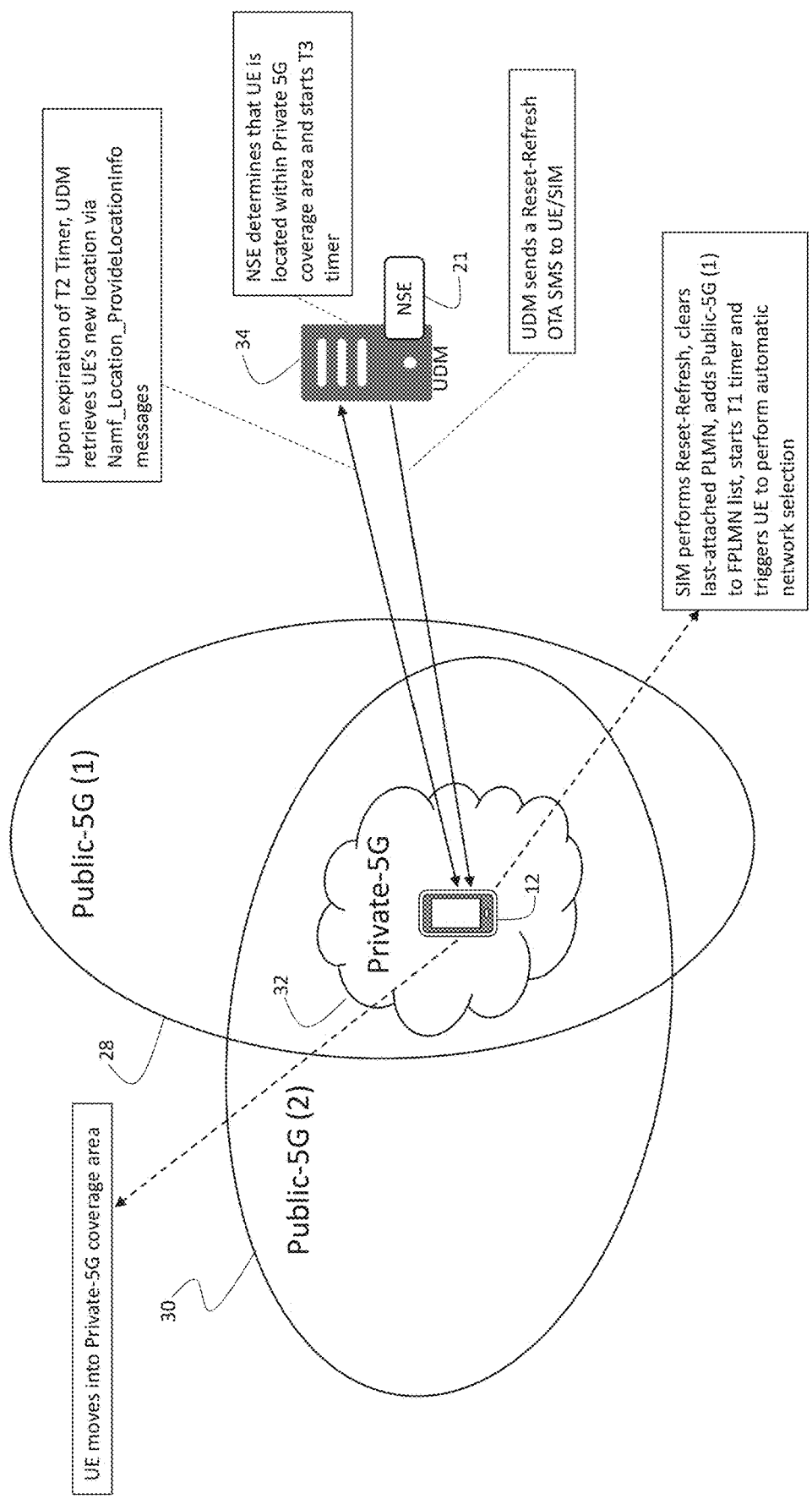
FIG. 3F is a diagram depicting the mobile device returning to a location within the coverage area of the Private 5G network and steering procedure being initiated to steer the mobile device to attach to the Private 5G network.

FIG. 3F depicts that when NSE 21 in UDM 34 detects that the new location of UE 12 is within Private-5G network 30 coverage, NSE 21 will trigger a 'Reset-Refresh' OTA command to UE 12, thus steering UE 12 back to Private 5G network 32, as described above.

Figure 4:
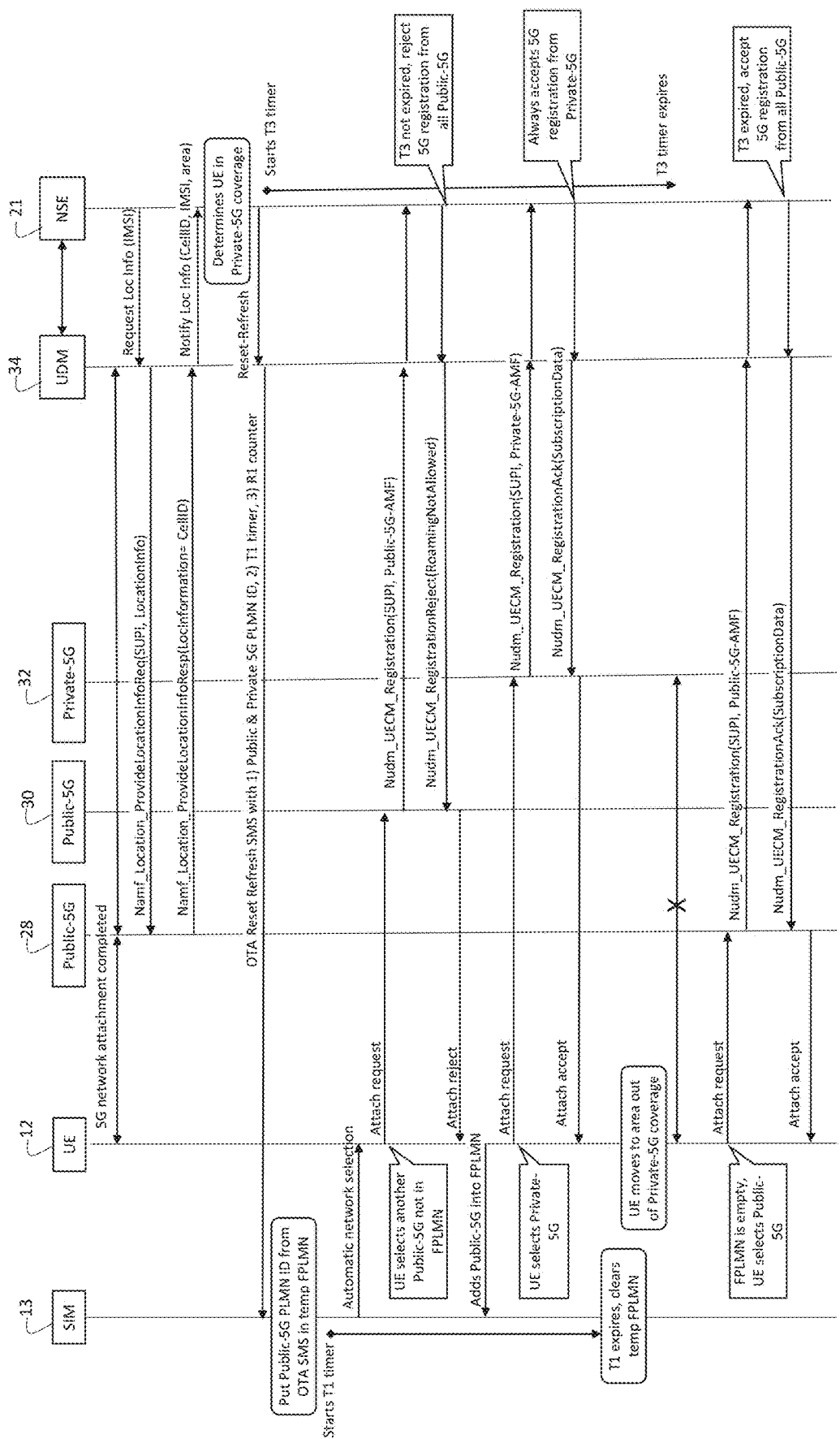
FIG. 4 is a signaling diagram depicting an exemplary signaling flow for the scenario depicted in FIGS. 3A-E.

FIG. 4 provides a signaling diagram for an embodiment of the invention in which mobile device is steered from a Public-5G PLMN to a Private-5G PLMN. This method is analogous to the method explained above in reference to the signaling diagram depicted in FIG. 2. The method begins with UE 12 attached to a Public-5G PLMN. Next, NSE 21 instructs UDM 34 to send a HTTP/2 Namf_Location_ProvideLocationInfoReq request to the AMF of first Public 5G network 28 to retrieve the location of UE 12. The AMF replies with the cell-ID in a HTTP/2 response message.

Next, NSE 21 determines that UE 12 is located within in a geographic location in which Private-5G network 32 has coverage. NSE 21 instructs UDM 34 to send an OTA SMS message containing (1) a list of Public-2G/3G/4G/5G PLMN IDs, (2) PLMN ID of Private-5G network 32, (3) a T1 timer value, and (4) R1 retry counter value. NSE 21 starts T3 timer. UE 12 passes the SMS content to SIM card 13, and SIM card 13 places the list of Public-2G/3G/4G/5G PLMN IDs in a temporary FPLMN list. SIM card 13 starts the T1 timer and instructs UE 12 to perform automatic network selection.

Continuing reference to FIG. 4, UE 12 skips network attachment from a Public PLMN in the FPLMN list, but may still attempt to attach to other Public-PLMNs not included on the FPLMN list—in this example, second Public 5G network 30. NSE 21 will trigger UDM 34 to reject such HTTP/2 Nudm_UECM_Registration request with 'RoamingNotAllowed' because second Public 5G network 30 is a non-preferred network and the T3 timer has not yet expired. Upon receiving the rejection, UE 12 will add PLMN ID of second Public-5G network 30 into the FPLMN list. Network attachment requests from other 2G/3G/4G/5G Public-PLMNs will be rejected in the same manner.

FIG. 4 further depicts that when UE 12 attempts to attach to Private-5G network 32, which NSE 21 will trigger UDM 34 to accept the attach request. From this point onward, UE 12 can access the Internet via Private-5G network 32.

Continuing reference to FIG. 4, when the T1 timer expires, SIM card 13 clears its temporary FPLMN list. When the T3 timer expires, NSE 21 will allow UDM 34 to start to accept network attachments from Public-5G networks 28 and 30.

When UE 12 moves to an area out of the Private-5G coverage, the UE will detach from the Private-5G network. UE 12 will attempt to attach to Public-5G network 28 or 30. Because FPLMN list has been cleared upon expiration of T1 and because T3 timer has expired, NSE 21 will direct UDM 34 to accept the HTTP/2 Nudm_UECM_Registration request from Public-5G network 28 or 30. From this point onward, UE 12 can access the Internet via Public-5G network 28 or 30.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of steering a mobile device attached to a first non-preferred mobile network to a preferred mobile network having a coverage area at least partially overlapping with the first non-preferred mobile network, the method comprising:
    determining whether the current location of the mobile device is within the coverage area of the preferred mobile network;
    responsive to determining that the current location of the mobile device is within the coverage area of the preferred network, triggering a steering command to the mobile device, wherein the steering command directs the mobile device to detach from the first non-preferred mobile network, place the first non-preferred mobile network on a list of Forbidden Public Land Mobile Networks (FPLMN), and to initiate a first network selection procedure to attach to an available network not included on the list of FPLMN; and
    responsive to receiving a first attachment request for the mobile device to attach to the preferred network, triggering an attachment accept message to the mobile device, thereby enabling the mobile device to attach to the preferred mobile network.

2. The method of claim 1, wherein responsive to receiving a second attachment request prior to the first attachment request, the second attachment request being from a second non-preferred network, triggering an attachment rejection to the mobile device, wherein in response to the attachment rejection the mobile device is configured to add the second non-preferred network to the list of FPLMN and to initiate a second network selection procedure to attach to another available network not included on the list of FPLMN.

3. The method of claim 1, wherein the list of FPLMN is stored in a Subscriber Identity Module (SIM).

4. The method of claim 1, wherein the list of FPLMN is configured to be cleared after expiration of a first predetermined duration after the mobile device receives the steering command.

5. The method of claim 4, wherein a timer for the first predetermined duration is set in the Subscriber Identity Module (SIM) responsive to the steering command.

6. The method of claim 4, wherein upon moving to a first new location outside the coverage area of the preferred network, the mobile device is configured to attach to the first non-preferred network after the list of FPLMN has been cleared.

7. The method of claim 6, wherein upon expiration of a second predetermined duration after the mobile device attaches to the non-preferred network, a network application is configured to determine whether the second new location is within the coverage area of the preferred mobile network, and responsive to determining that the second new location is within the coverage area of the preferred mobile network, triggering the steering command to the mobile device.

8. The method of claim 1, wherein the steps of determining whether the current location of the mobile device is within the coverage area of the preferred mobile network and triggering a steering command to the mobile device are executed by a network application.

9. The method of claim 8, wherein the network application is hosted at a Home Public Land Mobile Network (HPLMN) to which the mobile device is subscribed.

10. The method of claim 9, wherein the network application is hosted on a Home Subscriber Server (HSS) or Unified Data Management (UDM) node.

11. The method of claim 1, wherein the preferred mobile network is a Private Long Term Evolution (LTE) network or a Private 5$^{th}$ Generation (5G) network.

12. The method of claim 1, wherein the steering command is sent to the mobile device as an Over-The-Air (OTA) Short Message Service (SMS) message.

13. The method of claim 1, wherein the steering command includes the list of FPLMN, an identification of the preferred mobile network, or a first predetermined duration upon expiration of which the mobile device is to clear the list of FPLMN.

14. The method of claim 1, wherein the steering command is a 'Reset-Refresh' message.

15. The method of claim 2, wherein during a predetermined duration subsequent to the steering command, the second attachment request for the mobile device to attach to the second non-preferred network is rejected.

16. The method of claim 2, wherein the second attachment request is rejected by sending a 'RoamingNotAllowed' response to the second non-preferred mobile network from a Home Public Land Mobile Network (HPLMN) associated with the mobile device.

17. A non-transitory computer readable medium having a set of instructions stored thereon that, when executed by a computer processor, configured to steer a mobile device from a first non-preferred mobile network to which the mobile device is attached to a preferred mobile network, the set of instructions comprising:
  determining whether the current location of the mobile device is within the coverage area of the preferred mobile network;
  responsive to determining that the current location of the mobile device is within the coverage area of the preferred network, triggering a steering command to the mobile device, wherein the steering command directs the mobile device to detach from the first non-preferred mobile network, place the first non-preferred mobile network on a list of Forbidden Public Land Mobile Networks (FPLMN), and to initiate a first network selection procedure to attach to an available network not included on the list of FPLMN; and
  responsive to receiving a first attachment request for the mobile device to attach to the preferred network, triggering an attachment accept message to the mobile device, thereby enabling the mobile device to attach to the preferred mobile network.

18. The non-transitory computer-readable medium of claim 17, responsive to receiving a second attachment request prior to the first attachment request, the second attachment request being from a second non-preferred network, triggering an attachment rejection to the mobile device, wherein in response to the attachment rejection, the mobile device is configured to add the second non-preferred network to the list of FPLMN and to initiate a second network selection procedure to attach to another available network not included on the list of FPLMN.

19. The non-transitory computer-readable medium of claim 17, wherein the list of FPLMN is cleared after expiration of a first predetermined duration after the mobile device receives the steering command, thereby enabling the mobile device to attach to the first or the second non-preferred mobile network when the mobile device moves to a new location outside the coverage area of the preferred network.

20. The non-transitory computer-readable medium of claim 17, wherein subsequent to determining that the mobile device is within the coverage area of the preferred network, a timer is set for a predetermined duration during which attachment requests from non-preferred networks are rejected.

21. The non-transitory computer-readable medium of claim 17, wherein the steering command is sent to the mobile device as an Over-The-Air (OTA) Short Message Service (SMS) message and wherein the steering command includes the list of FPLMN, an identification of the preferred mobile network, or a first predetermined duration upon expiration of which the mobile device is to clear the list of FPLMN.

* * * * *